INVENTOR
HUGH G. NEIL
BY Swecker & Mathis
ATTORNEYS

Sept. 19, 1961  H. G. NEIL  3,001,080
INSPECTION APPARATUS
Filed Jan. 11, 1956  4 Sheets-Sheet 3

INVENTOR
HUGH G. NEIL
BY Swecker + Mathis
ATTORNEY

Sept. 19, 1961 H. G. NEIL 3,001,080
INSPECTION APPARATUS
Filed Jan. 11, 1956 4 Sheets-Sheet 4

INVENTOR
HUGH G. NEIL
BY Swecker + Mathis
ATTORNEY

United States Patent Office 3,001,080
Patented Sept. 19, 1961

3,001,080
INSPECTION APPARATUS
Hugh G. Neil, Knoxville, Tenn., assignor to Special Instruments Laboratory, Incorporated, Knoxville, Tenn., a corporation of Tennessee
Filed Jan. 11, 1956, Ser. No. 558,529
16 Claims. (Cl. 250—219)

This invention relates to inspection apparatus, and more particularly, to apparatus for inspecting web materials such as woven cloth.

Heretofore, the inspection of cloth has been carried out visually by employees especially trained for this job. The cloth was examined for flaws as it was fed past a viewing station on an inspection frame. When a flaw was detected, the operator would stop the feeding of the cloth so that the flaw might be repaired if possible. Then the feeding of the cloth would be resumed.

This process is subject to several disadvantages. It is tedious from the point of view of the operators of the inspection frames, and it is expensive and unreliable from the point of view of the plant management.

It is an object of the present invention to provide apparatus for automatically inspecting web material, such as cloth, so that visual examination can be dispensed with and so that uniformity of inspection standards can be assured.

It is a further object of this invention to provide photoelectric web inspection apparatus for detecting flaws which are very small as compared to the width of the web being inspected. More particularly, it is desired in connection with the inspection of print cloth that the detector react to flaws such as slubs and holes.

Another object of the present invention resides in the provision of web inspection apparatus having a flaw detector and having suitable means for controlling the feeding of the web in response to signals from the detector.

Still another object of the invention is the provision of inspection apparatus capable of detecting not only flaws in the material being inspected, but also the overall thickness of the material. In the case of fabrics, the apparatus gives, in addition to indications of the slubs and holes appearing in the fabric, an indication of weight of a cross section of the fabric.

It is a more specific object of this invention to provide photoelectric apparatus having a durable light source capable of giving uniform light over a substantial width of material to be inspected.

The foregoing objects are attained, according to one embodiment of the present invention, by an apparatus having web feeding means, web take-up means, and photoelectric detection means therebetween. An electric brake is associated with the feed means and is connected to the detector so that it is operated to stop the feeding of the fabric upon the detection of a flaw. The take-up means normally is driven through an electric clutch, but this clutch is operative upon the detection of a flaw to disconnect the take-up means from its drive. Flaw counters and a web thickness meter also may be included in the apparatus.

The photoelectric detector receives light from a light source in the form of an arc discharge fluorescent tube. This tube is energized by a radio frequency alternating current so as to maintain a steady light along the entire length of the tube. An inductance is connected to the tube to uncouple the severe tube fluctuations due to arcing from the radio frequency source.

The detector itself is sensitive to flaws of small magnitude. This is accomplished by the use of a number of detector heads arranged across the width of the detector, with each serving to scan a small area. The outputs from the several detector heads are not combined immediately. First a determination is made by suitable electric circuit means for each detector to ascertain whether or not a flaw appears in the section of fabric scanned by that detector. In this way the signal-to-noise ratio is high in spite of the relatively small flaws being detected.

The electric circuits employed include several features of particular significance. Among these is the fact that the photoelectric cells are so connected to their amplifiers that the incidence of a very large amount of light upon a cell will serve to remove that cell from the flaw detecting circuits. In this way the fact that the cloth does not cover the endmost cells of the group in certain instances is not a serious defect.

Another feature of the electric circuit used in connection with the detector of the present invention is that the initial amplifier stages for the signals emanating from the photoelectric cells are held within their normal operating ranges by the novel expedient of connecting all of their cathodes to ground through a common cathode resistance.

A better understanding of the invention and its many advantages will be gained from a consideration of the following detailed description of certain embodiments thereof illustrated in the accompanying drawings, in which:

(FIGS. 3, 4, and 5 have been rotated counterclockwise approximately 75°.)

FIG. 8 is a diagram of the electric circuits for utilizing the signals developed in the detector heads;

Figure 1:
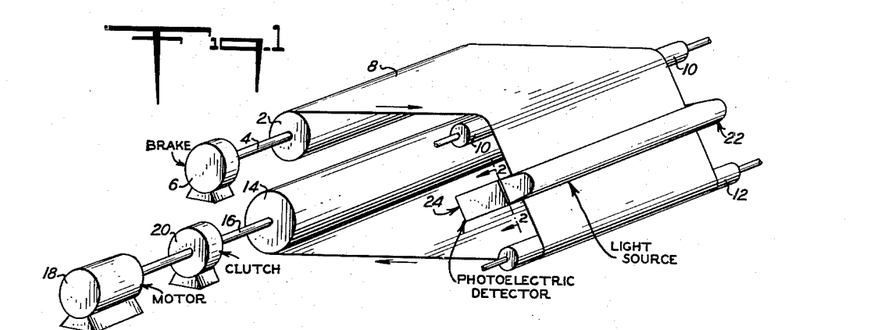
FIG. 1 is a diagrammatic perspective view of an inspection machine according to the present invention.

The inspection machine, diagrammatically illustrated in FIG. 1, includes a roll 2 of the material to be inspected. This material may be woven fabric, knit goods, webs of paper, or the like. The supply roll 2 is mounted in any suitable fashion upon a shaft 4 attached to an electric brake 6. The cloth 8 or other material from the supply roll 2 passes over idler rolls 10 and 12 and then is wound upon a receiving roll 14. In the case of woven fabrics, it is preferred that the warp threads extend lengthwise of the advancing fabrics. The roll 14 is mounted upon a shaft 16 driven by an electric motor 18 through a suitable electric clutch 20. No attempt has been made in FIG. 1 to illustrate the framework of the machine because the particular structure employed is of no importance to the present invention. Any of the well known inspection frames of the prior art may be used if desired.

As the cloth 8 passes between the idler rolls 10 and 12, it is examined for irregularities by the photoelectric inspection mechanism of the present invention. The numeral 22 is applied in FIG. 1 to indicate generally a light source disposed above the traveling cloth. Light from this source passes through the cloth to a detector designated generally by the numeral 24.

Figure 2:
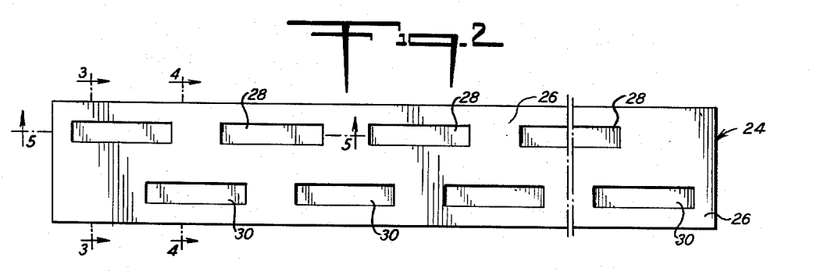
FIG. 2 is a view taken along the line 2—2 in FIG. 1, showing the upper surface of one form of photoelectric detector.
Figures 3, 4:
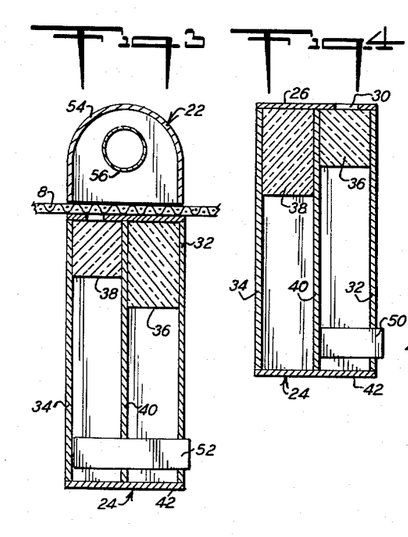
FIG. 3 is a cross sectional view taken along the line 3—3 in FIG. 2 and showing the relative positions of the light source, the web material being inspected, and the photoelectric detector.
FIG. 4 is a cross sectional view of the detector taken along the line 4—4 in FIG. 2.
Figure 4:
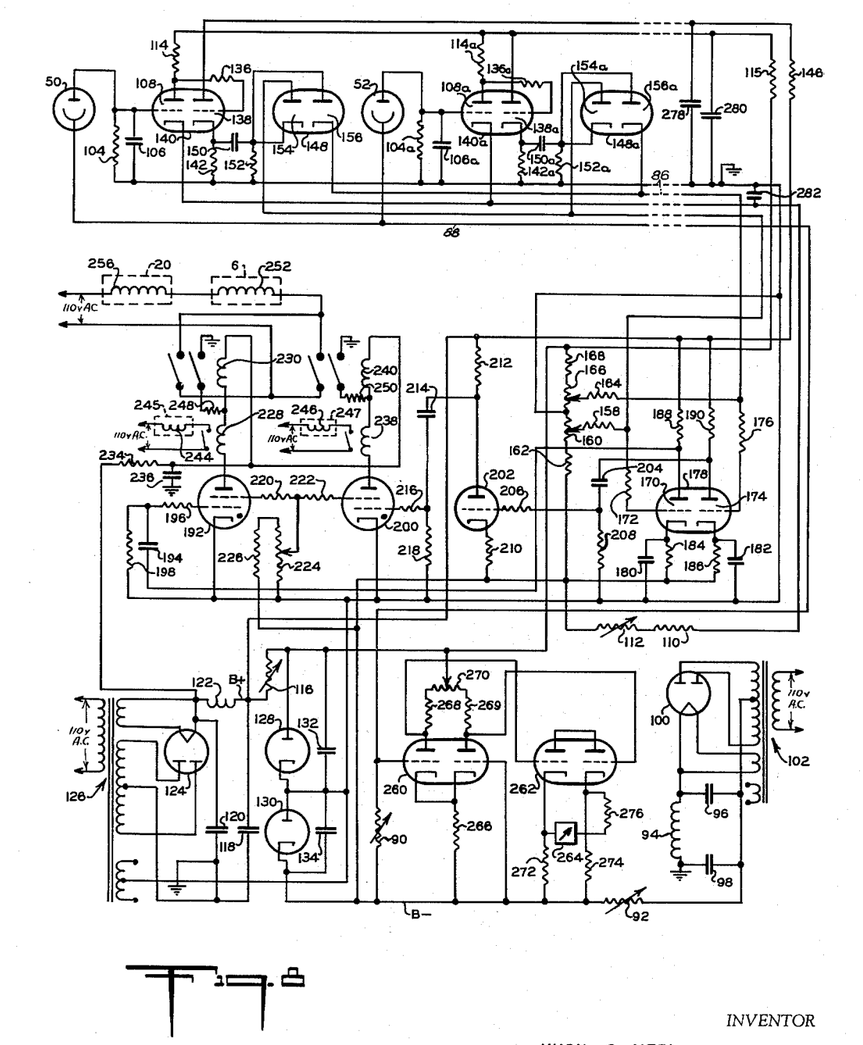
Figure 5:
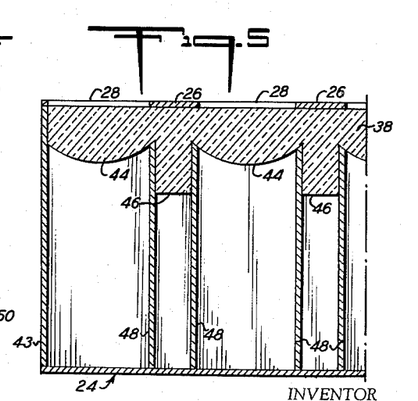
FIG. 5 is a cross sectional view of the detector taken along the line 5—5 in FIG. 2.

The structure of the detector 24 is illustrated in greater detail in FIGS. 3, 4 and 5. The upper surface of the detector 24 is covered by a metal plate 26 provided with two rows of slots 28 and 30. Each of these slots may be on the order of two inches in length, and each is preferably of a width corresponding to the maximum width of the defects to be detected by the apparatus. In the case of cloth inspection, the width of each of the slots 28 and 30 should correspond to the thickness to be expected of a slub in the fabric. As indicated in FIG. 2, the slots 28 and 30 are staggered and overlapped so that together they permit inspection along the entire width of the fabric.

Beneath the plate 26, the detector 24 is in the form of a sandwich comprising outer layers 32 and 34 of aluminum or other suitable opaque material, intermediate layers of a transparent plastic 36 and 38, and a central layer 40 of an opaque material. The bottom of the detector 24 is closed by an opaque plate 42, and the ends, by opaque plates such as 43 (FIG. 5).

Each of the blocks of plastic 36 and 38 is shaped in the manner indicated in FIG. 5 to provide lens portions 44 beneath each of the slots in the upper plate 26 and to provide spacers 46 intermediate the lenses 44. The straight sides of the spacers 46 serve as shoulders for strips 48 of aluminum or some other opaque material. These strips 48 have a lateral extent corresponding to the thickness of the plastic with which they are associated. For example, the strips 48 associated with the plastic block 38 extend between the side plate 34 and the centrally located divider plate 40.

The arrangement is such that the space beneath each one of the slots 28 and 30 forms a light chamber into which light may be admitted only through the slot at the top. Near the bottom of each of the light chambers thus formed, there is located a photoelectric cell. These cells conveniently are provided in two sizes so that they may all extend to one of the faces of the assembly 24.

The cells 50 for the light chambers beneath the slots 30 are short, and they extend outwardly from the light chambers through the side wall 32. It will be understood in this connection that no light is allowed to enter the light sensitive portions of the cell 50 from the exterior of the assembly, however.

The photoelectric cells 52 for the light chambers located beneath the slots 28 are elongated somewhat, as indicated in FIG. 3. These cells pass through the centrally located wall 40 and the side wall 32. Again, it should be pointed out that only light from the chamber beneath a slot 28 may affect the cell 52.

The light source 22, shown in FIG. 3, includes a reflector 54 and a light emitting element 56. The requirements imposed upon this light source are unusual and they will be considered in detail.

In view of the fact that frequencies produced by light shining through a slub are on the order of 200 to 3,000 cycles per second, depending upon the size of the slub and speed of the cloth, and in view of the fact that it is desirable to measure the yard by yard uniformity of the cloth, the light falling on the cloth must be of constant brilliance and without ripple to a frequency of 0 to 20,000 cycles. Such light may be derived from well filtered incandescent lamps, but the obtaining of a uniform intensity across the width of the cloth by means of a lens system is both cumbersome and expensive.

Moreover, the use of a fluorescent lamp as the light emitter 56 is subject to serious disadvantages if such a lamp is operated on direct current. After direct current operation of the lamp for several days, two difficulties usually arise. First, one end of the tube becomes dark, and a flicker on the order of 500 to 2,000 cycles per second appears in this region. This flicker is of considerable magnitude so that it masks the signals produced by the defects in the cloth. Second, continuous oscillations of smaller magnitude and a frequency on the order of 1,000 cycles per second develop in the tube.

According to the present invention, these difficulties are overcome by the use of a fluorescent tube energized by a radio frequency source. Since the upper limit of the signal frequencies to be expected is on the order of 5,000 cycles per second, an arc discharge lamp driven by a radio frequency source in the range of 50 to 100 kilocycles per second is entirely satisfactory.

It will be evident that this feature of the invention is not necessarily limited to web inspectors. It can be used in a variety of applications, and is particularly advantageous in those situations where relatively low frequencies normally are imposed upon the outputs of light sensitive devices.

Figure 6:
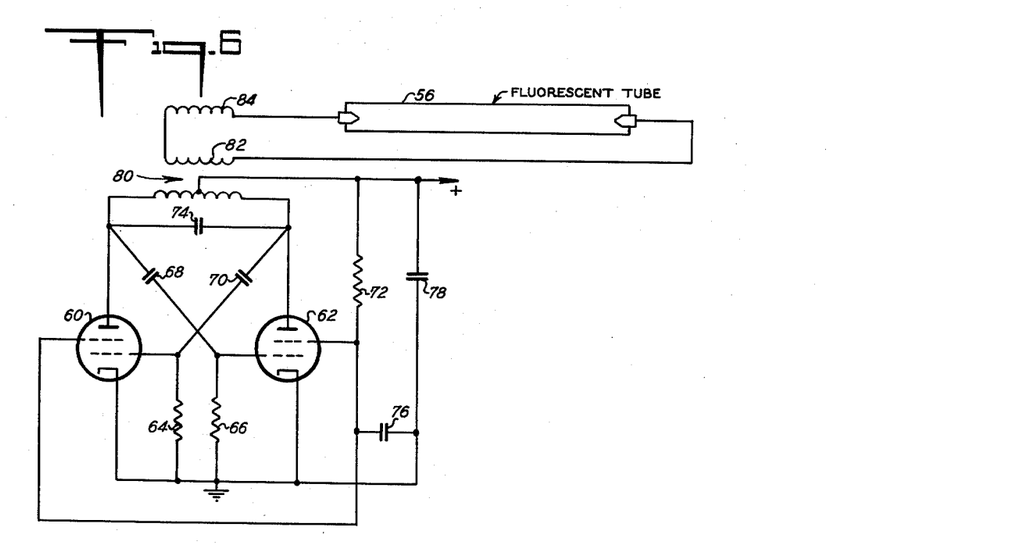
FIG. 6 is a diagram of an electric circuit for energizing the fluorescent tube which serves as a light source for the inspection apparatus of the present invention.

The oscillator shown in FIG. 6 is conventional in the art, and its operation need not be described in detail. It comprises a pair of electron tubes 60 and 62 connected together as shown in a circuit containing resistances 64, 66, and 72, and capacitances 68, 70, 74, 76, and 78, of suitable values. The power supply should furnish direct current at about 400 volts.

The output of the oscillator is through a transformer 80, the secondary 82 of which is connected across the fluorescent tube 56 to supply sufficient potentials to the tube 56 to cause it to operate as an arc discharge device. In order to prevent the firing peak from the fluorescent tube 56 from being fed back into the oscillator through the transformer 80, an inductance 84 of, for example, 2.5 millihenrys is utilized in the fluorescent tube circuit. This inductance 84 is important to the successful operation of the circuit because the extreme fluctuations which occur incident to the arcing of the tube 56 must not be allowed to interfere with the oscillator. In effect, the inductance 84 serves to uncouple the oscillator and the fluorescent tube 56 as far as the extreme fluctuations are concerned.

The general nature of the inspection operation carried out by the apparatus described above will be evident. Light from the source 22 passes through the material being inspected and into the slots 28 and 30. The amount of light entering the slots 28 and 30 depends upon the shadow characteristics of the material being inspected. As the material becomes more dense, less light will be transmitted to the slots, and vice versa.

Figure 7:
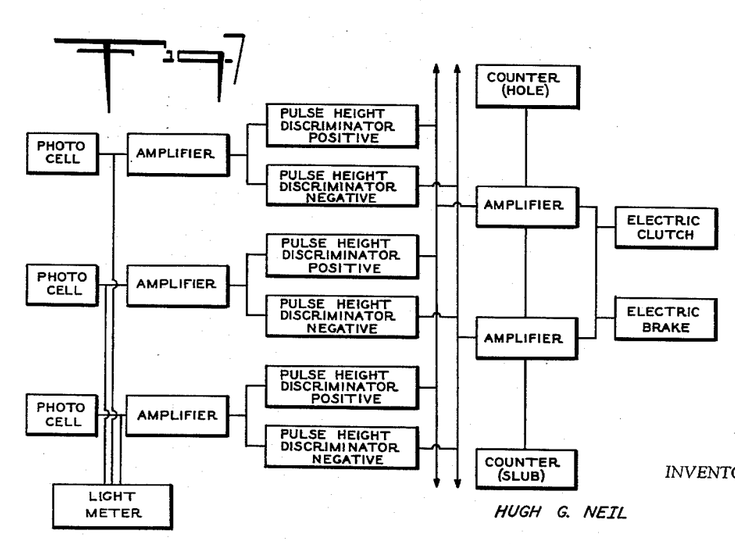
FIG. 7 is a block diagram indicating the operations which take place in response to signals from the detector.

These variations in light intensity are evaluated and utilized in the apparatus of this invention in the manner indicated by the block diagram in FIG. 7. There are only three photocells in this diagram, but this represents merely an attempt to simplify the disclosure. In an actual embodiment of a cloth inspector, there might be thirty or more of these photocells connected in parallel.

For one type of evaluation, the signals from the several photocells may be combined almost immediately, if desired. As shown, all of the cells are connected to a light meter which is caused to indicate the average of the light intensities at the several cells. This average is a measure of the overall density, or weight per yard, of the material being inspected.

For the detection of flaws, however, it is not desirable to combine the several photocell signals until after they have been evaluated independently. This technique assures a high signal-to-noise ratio, which simplifies the circuits and increases the reliability of the equipment. Consequently, the signal from each cell is amplified and passed to pulse discriminators which serve to distinguish between positive and negative variations, and which serve also to block the passage of all those signal components having magnitudes below the levels corresponding to the types of flaws to be expected. Thus, the outputs from the several pulse discriminators represent definite flaws in the goods being inspected.

A flaw pulse delivered by any of the pulse discriminators is fed to one of a pair of amplifiers, and then is delivered to a counter mechanism, the electric clutch 20, and the electric brake 6. The counters provide records which are valuable in connection with the quality control procedures of the plant, and the clutch 20 and brake 6 function to stop the feeding of the cloth upon the discovery of a flaw so that the flaw may be repaired if possible.

In the circuit diagram of FIG. 8 only two of the many photocells 50 and 52 of the detector of the present invention have been shown. Each of the photocells has associated with it certain circuit components which are connected in parallel with the corresponding components associated with the other photocells. This arrangement is illustrated in FIG. 8 where the components associated with the cell 52 bear reference characters which correspond, except for addition of the letter "a," to those applied to the components associated with the cell 50. The dotted lines 86 indicate the relative position of the omitted branches of the circuit.

The cathodes of all of the photocells 50 and 52 in the detector 24 are supplied with a negative potential, of about −148 volts by a line 88, variable resistances 90 and 92, a filter system made up of an inductance 94 and capacitances 96 and 98, a rectifier 100, and a transformer 102.

The anode of the photocell 50 is connected to ground through a resistance 104, which should be calibrated for the sensitivity of the cell 50, and through a capacitance 106. The capacitance 106 serves to short out the radio frequency portion of the signal from the photocell, which portion may be attributed to the above-described radio frequency excitation of the light source 56.

As thus modified, the signal from photocell 50 is led to the grid of a first amplifier stage 108. The cathode of this stage 108 is connected through cathode resistances 110 and 112 to the negative voltage supply described above. Positive potentials are supplied to the anode of amplifier stage 108 through resistances 114 and 115, a variable resistance 116, a filter system made up of capacitances 118 and 120 and inductance 122, a rectifier 124, and a transformer 126.

Preferably, voltage regulators 128 and 130, with suitable capacitances 132 and 134, are connected as shown to the positive and negative potential supplies to minimize fluctuations.

One significant feature of the portion of the circuit described above is the relationship between the photocell 50 and the amplifier stage 108. The cell 50 is of the type in which the conductivity increases with an increase in the amount of light falling on the cell. Consequently, the effect produced when an excessive amount of light falls on the cell 50 is a sharp lowering of the potential at the grid of the amplifier stage 108. As the grid becomes more negative with respect to the cathode of the stage 108, this stage is effectively blocked or shut off.

This feature is significant primarily in connection with the scanning of the edge portions of the cloth. It sometimes happens that the cloth does not cover completely the endmost of the slits 28 and 30 in the detector 24, and the photocells under these slits give signals corresponding to those which would result from very large holes in the fabrics. These unwanted signals are kept out of the flaw-registering portion of the circuit by the blocking of the first amplifier stage 108.

It should be noted that this effect could not be obtained if the photocell 50 were used in the conventional way, with the output signal being taken from the cathode of the cell. As the grid of the amplifier became excessively positive under the influence of a greatly increased amount of light, the amplifier would respond with a signal of large magnitude which ultimately would cause the stopping of the fabric feeding means and which would be recorded as a "hole" by the appropriate counter mechanism.

Another significant feature of the circuit which should be particularly pointed out is that resistances 110 and 112 for the cathode of the first amplifier stage 108 are common to the cathodes of all of the first amplifier stages 108, 108a, etc. in the system. Connecting all of these cathodes through the same resistance path has the advantage that the potentials of all of these remain at about the same level, even though one of them may momentarily pass more current. The result is that an automatic levelling effect is produced, and all of the initial amplifier stages are held within their optimum operating ranges.

With this condition being maintained, the amplification given a slub or hole signal is exaggerated, and at the same time, the effect produced by a condition which extends across the entire width of the fabric is minimized. Thus, this portion of the circuit is sensitive to flaws rather than to overall variations in fabric weight, such as might be caused by different weights of the weft yarns on successive bobbins. Moreover, it frequently happens that this feature of the invention makes it unnecessary to adjust the circuits in order to adapt the equipment for use in inspecting fabrics of different weights.

After being amplified by the amplifier stage 108, the signals originating in the photocell 50 pass through a resistance 136 to a second amplifier stage 138, which is preferably a cathode follower. As illustrated, the stages 108 and 138 occupy the two halves of a twin triode 140. This is a convenient arrangement, but obviously it is not essential. The cathode of the stage 138 is connected to ground through a cathode resistance 142, and the anode is supplied with a positive potential through resistances 144 and 146.

The output from the second amplifier stage 138 is coupled to a pulse discriminator 148 by a capacitance 150 and a resistance 152. The pulse discriminator 148, shown in FIG. 8, is a twin diode tube, but it could be formed from a pair of separated diodes. The signals from the amplifier stage 138 are fed to the cathode of a first diode 154 and to the anode of the second diode 156 of the pulse discriminator 148.

It is a function of the discriminator to evaluate the signals received by refusing to transmit any pulses unless the incoming signals are of magnitudes indicative of flaws in the material being inspected. The nature of each flaw also is ascertained by the pulse discriminator 148 in that a hole in the fabric will cause the diode 154 to fire and a slub will cause the diode 156 to fire.

These results are obtained by maintaining the anode of the diode 154 negative, and the cathode of the diode 156 positive. The anode of the diode 154 is connected through a resistance 158 to the movable contact of a potentiometer 160, one side of which is connected to ground and the other side of which is connected to the negative potential source through a resistance 162. The cathode of the diode 156 is connected through a resistance 164 to the movable contact of a potentiometer 166, one side of which is connected to ground and the other side of which is connected through a resistance 168 to the positive potential source.

A pulse from the diode 154 passes to an amplifier stage 170 through a resistance 172, and a pulse from the diode 156 passes to an amplifier stage 174 through a resistance 176. The stages 170 and 174 may be in the form of a twin triode tube 178, as illustrated. The cathodes of stages 170 and 174 are connected to ground through capacitances 180 and 182, respectively, and to the negative potential source through resistances 184 and 186, respectively. The anodes of these stages are connected to the positive potential supply through resistances 188 and 190, respectively.

From the amplifier stage 170, a hole signal passes to a control grid of a thyratron 192 through a coupling composed of a capacitance 194 and resistances 196 and 198. A slub signal, on the other hand, passes through a phase inverter stage 174 to a control grid of a thyratron 200 through an intermediate tube 202. The coupling between the tube 202 and the amplifier stage 174 consists of a capacitance 204 and resistances 206 and 208. The cathode of the tube 202 is connected to the source of negative potential through a resistance 210, and the anode is connected to the source of positive potential through a resistance 212. The coupling between tube 202 and thyratron 200 consists of a capacitance 214 and resistances 216 and 218.

Each of the thyratrons 192 and 200 includes a grid in addition to the grid to which the incoming signals are fed, and these additional grids are connected through resistances 220 and 222 to the movable contact of a potentiometer 224. One side of the potentiometer 224 is connected to ground, and the other side is connected through a resistance 226 to the source of negative potential.

The anode circuit of the thyratron 192 is connected to the power supply through the coils of relays 228 and 230, and an RC coupling composed of a resistance 234 and a capacitance 236. The anode circuit for the thyratron 200 is similar. It includes the coils of two relays 238 and 240.

The relays 228 and 238 control the circuits of the hole and slub counters, respectively. In FIG. 8 the numeral 244 has been applied to an element representing a coil in the hole counter mechanism 245, while the numeral 246 has been applied to a corresponding coil in the slub counter 247. It will be understood that the counter circuits illustrated are purely diagrammatic. These may take any convenient form.

The relays 230 and 240 each have a pair of contacts. One contact of each pair is in a holding circuit, which serves to bypass the thyratron after the thyratron has once fired. These holding circuits for the coils of relays 230 and 240 also include resistances 248 and 250, respectively. The remaining contacts are connected in parallel with each other, as shown, in a circuit which includes a coil 252 associated with the electric brake 6 and a coil 256 associated with the electric clutch 20. Upon the closing of one of the relays 230 or 240, the brake 6 tends to stop the feeding of the fabric 8, and the clutch 20 disconnects the motor 18 from the take-up roll 14. After a flaw has been repaired, the feeding of the fabric may be resumed by manually opening the holding circuit of the appropriate one of the relays 230 and 240.

As mentioned earlier in this description, it is desirable to include in a cloth inspector, means for indicating the average thickness of the cloth. This may be accomplished by connecting all of the photoelectric cells 50 and 52 in parallel, as described, and by connecting the whole group to a suitable meter circuit.

A signal representing the overall light conductivity of the fabric being inspected appears across the variable resistor 90. This signal is amplified and evaluated by a meter circuit comprising two tubes 260 and 262 and a meter 264. If desired the meter 264 may include means, such as a stylus, and a continuously advancing web of paper, for recording continuously the fabric thickness measurements obtained.

In the illustrated meter circuit, the cathodes of the tube 260 are connected to each other and to the negative potential source through a resistance 266. The two grids of the tube 260 are connected to opposite sides of the variable resistance 90, and the anodes are connected to the positive potential source through loading resistances 268, 269, and a tapped resistance 270.

The anodes of the tube 260 are tied together, and the cathodes are connected to the negative potential source through resistances 272 and 274. The meter 264 is connected between the cathodes and has a protecting resistance 276 in series therewith.

The illustrated circuit is completed by capacitances 278, 280, and 282 which serve, respectively, to filter AC from the two positive potential lines and the negative potential line.

Figure 9:
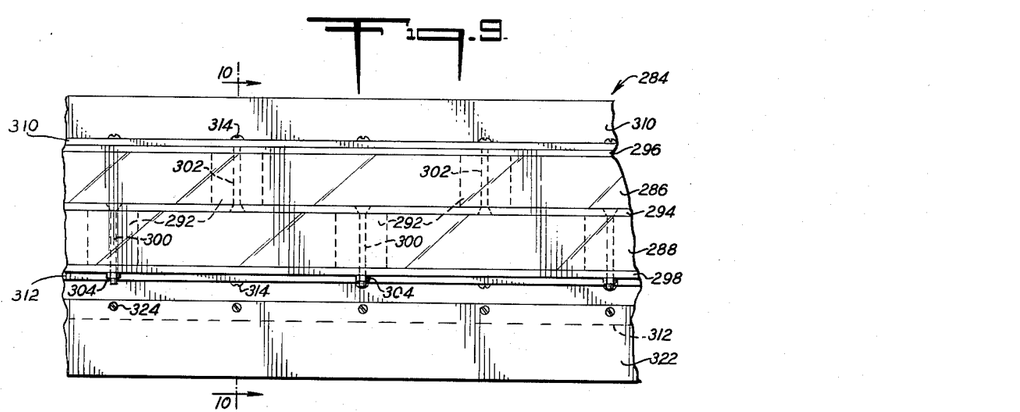
FIG. 9 is a view similar to FIG. 2, but showing another embodiment of the detector.
Figure 10:
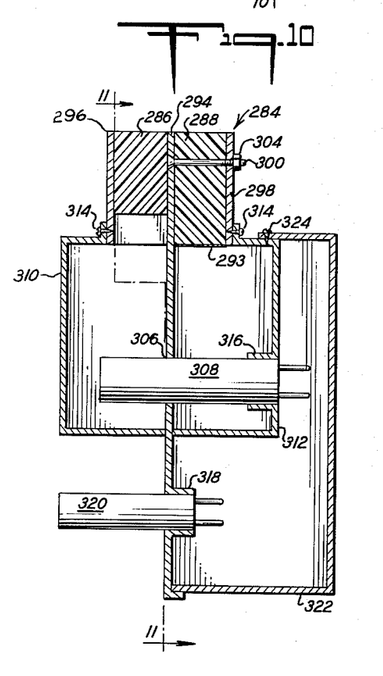
FIG. 10 is a cross sectional view taken along the line 10—10 of FIG. 9.
Figure 11:
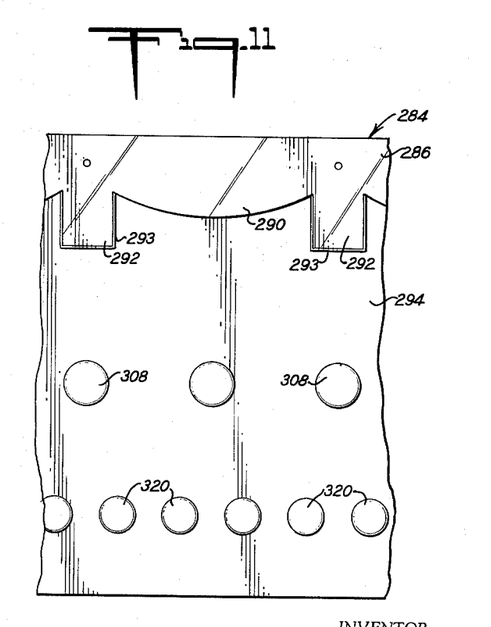
FIG. 11 is a cross sectional view taken along the line 11—11 in FIG. 10 with the electrical components in end elevation.

FIGURES 9, 10 and 11 illustrate a detector 284 which may be employed instead of the detector 24 described above in connection with FIGURES 3, 4 and 5.

The detector 284 includes a pair of transparent plastic layers 286 and 288 which are similar in shape to the plastic layers 36 and 38 of FIGS. 3 to 5. Each includes lens portions 290 with intervening spacer portions 292, and the lens portions 290 of one of the transparent layers 286 and 288 is disposed opposite the spacer portions 292 of the other of the layers. The lower surfaces of each of the spacer portions 292 is provided with an opaque coating 293, such as black paint for example.

The transparent layers 286 and 288 are held in position between a central metal plate 294 and a pair of metal reinforcing members or side plates 296 and 298 to provide a sandwich structure. In assembling the sandwich, bolts 300 first are inserted into countersunk holes in the central plate 294. Then, the central plate 294, the plastic layer 286, and the side plate 296 are connected together by screws 302, which fit into countersunk holes in the central plate 294 and which are threaded into the side plate 296. Next, the plastic layer 288 and the side plate 298 are fitted onto the protruding ends of the bolts 300 and secured together by nuts 304 which threadedly engage the end portions of the bolts. The bolts 300 and the screws 302 pass through spacer portions 292 of the plastic layers 286 and 288 so that they do not interfere with the collection of light by the lens portions 290.

Below the center of each of the lens portions 290 of the plastic layers 286 and 288, the central plate 294 is provided with a hole 306 for the reception of a photocell 308. These photocells correspond in function to the photocells 50 and 52 of FIGS. 3 and 4. However, they are all the same size, and they are all mounted in the same way.

The photocells 308 are shielded from extraneous light by covers 310 and 312 which may be attached to the side plates 296 and 298 by screws 314. The lower edges of the covers 310 and 312 may simply abut against the central plate 294, as illustrated, or, if desired, they may be secured thereto by any suitable means. The cover 312 is formed with sockets 316 for the ends of the several photocells 308.

It should be noted that, in this embodiment, there are no elements corresponding to the top plate 26 and the strips 48 of FIGS. 2 to 5, and that each of the photocells 308 is exposed on both sides of the central plate 294. In these respects the physical separation of the several light chambers is less complete. It has been found in practice, however, that the opaque coatings 293 and the focusing effected by the lens portions 290 result in adequate separation of the light rays so that the only significant amounts of light reaching a given photocell 308 are those which pass through the lens portion 290 immediately above it.

Below each of the photocell openings 306, the central plate 294 is provided with a pair of sockets 318. Each of these sockets receives an electron tube 320, which corresponds to one of the tubes 140 or 148 indicated in FIG. 8. With this arrangement, it is possible to locate the electrical components directly associated with the photocells 308 in the detector 284.

A sheet metal housing 322 is attached to the cover 312 by screws 324 or other suitable means. This housing may fit against the lower end of the central plate 294 in the manner illustrated in FIG. 10, or it may be secured to the central plate in any convenient way. The space defined by the housing 322 accommodates the wiring and the small circuit components, such as resistors and capacitors, associated with the photocells 308 and the tubes 320.

Although certain embodiments of this invention have been described in detail, various alterations and modifications will be apparent to persons skilled in the art. Moreover, other combinations and fields of utility for certain of the features of the invention will be obvious. Consequently, it is intended that the foregoing description be considered as exemplary only, and that the scope of the invention be ascertained from the following claims.

I claim:

1. Apparatus for determining the existence of slubs or holes in cloth comprising means for advancing the cloth along a path, a plurality of separate sensing units arranged across the width of the cloth in overlapping relation so as to cover the entire width of the cloth, each of said units being operable to sense the condition of the cloth over an area the width of which is small enough that a signal of substantial magnitude is produced by the passage of a slub or hole through said area, and separate discriminator means operatively connected to each of said sensing units for distinguishing between slub or hole signals and signals of lesser magnitudes.

2. Apparatus for determining the existence of slubs and holes in cloth comprising means for advancing the cloth along a path, a plurality of separate electric sensing units arranged across substantially the entire width of the cloth and responding to density variations in the cloth by changes in their electrical condition, each of said units being responsive to the density of a segment only of the width of the cloth, a plurality of first unidirectional current flow devices having a positive terminal and a negative terminal, a plurality of second unidirectional current flow devices having a positive terminal and a negative terminal, circuit means operatively connecting each of said sensing units to the negative terminal of one of said first and to the positive terminal of one of said second unidirectional current flow devices so that the changes in the electrical condition of a sensing unit are reflected in changes in the potentials of such terminals, means for imparting a negative bias to the positive terminal of said first flow device, means for imparting a positive bias to the negative terminal of said second flow device, first counter means operatively connected to all of said first unidirectional flow devices for recording the number of occasions on which current flows in such first devices, and second counter means operatively connected to all of said second unidirectional flow devices for recording the number of occasions on which current flows in such second devices.

3. Apparatus for examining woven fabrics comprising means for advancing a fabric along a path with the warp threads of said fabric extending generally parallel to said path, light-sensitive means on one side of said path, an electric light source on the other side of said path opposite said light-sensitive means, and circuit means for supplying radio frequency energizing current to said light source of such a high frequency related to the frequencies of the light variations resulting from the passage of light through the spaces between the threads of the fabric that said light source will not flicker at a frequency of an order close to the frequencies of the light variations resulting from the passage of light through the spaces between the threads of the woven fabrics.

4. Apparatus for determining the existence of slubs and holes in cloth comprising means for advancing the cloth along a path, light-sensitive means on one side of said path, a fluorescent tube extending across the entire width of said cloth on the other side of said path at a position opposite said light-sensitive means, circuit means for supplying a radio frequency energizing current to said fluorescent tube, and capacitance means operatively associated with said light-sensitive means for shorting out that portion of the electric signal from said light-sensitive means attributable to the radio frequency energization of said tube.

5. Apparatus for inspecting material for localized irregularities comprising means for advancing the material along a path, a plurality of separate electric sensing units arranged across the width of the material and responding to density variations in the material by changes in their electrical condition, a plurality of first amplifier stages each comprising a negative element, a positive element, and a control element, means connecting each of said sensing units to the control element of one of said amplifier stages, and a common resistance path for the negative elements of all of said first amplifier stages, whereby the amplification given by an amplifier stage to a signal resulting from an irregularity sensed by less than all of said sensing units is greater than that given to a signal resulting from a condition sensed by all of said sensing units.

6. Apparatus for inspecting material comprising a plurality of electric sensing units arranged across the width of the material and responding to density variations in the material by changes in their electrical conditions, a plurality of first unidirectional current flow devices for amplifying the variations in the electrical conditions of said sensing units, each of said devices comprising a negative terminal, a positive terminal, and a control terminal, and circuit means operatively connected to one of said sensing units and the control terminal of a unidirectional current flow device in such a way that the potential of said control terminal becomes negative and blocks the passage of current through such device in response to an electrical condition in the sensing unit corresponding to an extremely low density.

7. Apparatus for inspecting cloth comprising means for advancing the cloth along a path, a light source on one side of said path, a plurality of photoelectric sensing units arranged across the width of the cloth on the other side of said path opposite said light source, circuit means for applying a negative potential to the cathode of each of said photoelectric sensing units and for connecting the anode of each unit to ground, an electronic amplifier for each of said sensing units, each of said amplifiers including a control element, and means for connecting the anode of each sensing unit to the control element of the associated amplifier in such a way that an extraordinarily large drop in the potential of the anode will lower the potential of the control element sufficiently to block substantially the passage of current through the amplifier.

8. Apparatus for inspecting cloth comprising means for advancing the cloth along a path, a light source on one side of said path, a plurality of photoelectric sensing units arranged across the width of the cloth on the other side of said path opposite said light source, circuit means for applying a negative potential to the cathode of each of said photoelectric sensing units and for connecting the anode of each unit to ground, an electronic amplifier for each of said sensing units, each of said amplifiers including a control element and a cathode, means for connecting the anode of each sensing unit to the control element of the associated amplifier in such a way that an extraordinarily large drop in the potential of the anode will lower the potential of the control element sufficiently to block substantially the passage of current through the amplifier, and a common resistance path for the cathodes of all of said electronic amplifiers.

9. In apparatus for inspecting material, the improvement which comprises a photoelectric detector including a central member of opaque material, first and second transparent members on opposite sides of said central member, each of said transparent members including a series of spaced lens portions and intervening opaque spacer portions with the lens portions of one of said transparent members being disposed opposite the spacer portions of the other of said transparent members, a light-sensitive element disposed beneath each of said lens portions, and cover means for preventing the passage of light to said light-sensitive elements except through said lens portions.

10. Cloth inspection apparatus for determining the existence of flaws in the nature of localized density irregularities of predetermined minimum magnitude comprising means for advancing the cloth along a path, a plurality of separate electrical sensing units arranged across substantially the entire width of the cloth passing along said path and responding to density variations in the cloth by changes in their electrical condition, each of said units being operable to sense the condition of a segment only of the width of the cloth, a plurality of electrical discriminator means each operable to distinguish between electrical signals having a magnitude above a predetermined value and other electric signals, circuit means connecting each of said sensing units to a separate one of said discriminator means for transmitting to each of the discriminator means signals from one only of said sensing units so that the magnitude of each such signal is evaluated independently, and means connected to all of said discriminator means for stopping the advance of the cloth in response to actuation of any one of said discriminator means.

11. Cloth inspection apparatus for determining the existence of slubs and holes in cloth comprising means for advancing the cloth along a path; a plurality of light-sensitive units arranged across substantially the entire width of the cloth passing along said path and responding to density variations in the cloth by changes in their electrical conductivity, each of said units being operable to sense the condition of a segment only of the width of the cloth; a control circuit including means for stopping the advance of the cloth and a pair of control devices connected in parallel so that actuation of either of said devices will cause actuation of said means for stopping the advance of the cloth; a group of first electrical discriminator means connected to one of said control devices so that actuation of any one of said first discriminator means will cause actuation of such control device, each of said first electric discriminator means being operably connected to one only of said light-sensitive units and each being responsive only to changes in the conductivity of the light-sensitive unit connected thereto corresponding to the movement of a slub passing such unit; and a group of second electrical discriminator means connected to the other of said control devices so that actuation of any one of said second discriminator means will cause actuation of such control device, each of said second electrical discriminator means being operably connected to one only of said light-sensitive units and each being responsive only to changes in the conductivity of the light-sensitive unit connected thereto corresponding to the movement of a hole passing such unit.

12. Cloth inspection apparatus comprising means for advancing cloth along a path, detector means operable as said length of cloth passes along said path to sense density variations in the cloth, first evaluator means operably connected to said detector means and operating to determine what density variations sensed by said detector means correspond to slubs or holes, second evaluator means operably connected to said detector means to measure the average thickness of said cloth over an area extending substantially from one side edge to the other side edge of said cloth, means connected to said second evaluator means for indicating the thickness of the cloth, and means connected to said first evaluator means and operating in response to the detection of either a slub or a hole.

13. Cloth inspection apparatus for determining the existence of slubs and holes in cloth comprising means for advancing the cloth along a path; a plurality of light-sensitive units on one side of said path arranged across substantially the entire width of the cloth passing along said path and responding to density variations in the cloth by changes in their electrical conductivity, each of said units being operable to sense the condition of a segment only of the width of the cloth; a fluorescent tube extending across the entire width of said cloth on the other side of said path at a position opposite said light-sensitive means; circuit means for supplying radio frequency energizing current to said fluorescent tube; a control circuit including means for stopping the advance of the cloth and a pair of control devices connected in parallel so that actuation of either of said devices will cause actuation of said means for stopping the advance of the cloth; a group of first electrical discriminator means connected to one of said control devices so that actuation of any one of said first discriminator means will cause actuation of such control device, each of said first electric discriminator means being operably connected to one only of said light-sensitive units and each being responsive only to changes in the conductivity of the light-sensitive unit connected thereto corresponding to the movement of a slub past such unit; and a group of second electrical discriminator means connected to the other of said control devices so that actuation of any one of said second discriminator means will cause actuation of such control device, each of said second electrical discriminator means being operably connected to one only of said light-sensitive units and each being responsive only to changes in the conductivity of the light-sensitive unit connected thereto corresponding to the movement of a hole past such unit.

14. Cloth inspection apparatus for determining the existence of slubs and holes in cloth comprising means for advancing the cloth along a path; a plurality of light-sensitive units arranged across substantially the entire width of the cloth passing along said path and responding to density variations in the cloth by changes in their electrical conductivity, each of said units being operable to sense the condition of a segment only of the width of the cloth; a group of first electrical discriminator means each of which is operably connected to one only of said light-sensitive units and each being responsive only to changes in the conductivity of the light-sensitive unit connected thereto corresponding to the movement of a slub past such unit; and a group of second electrical discriminator means each of which is operably connected to one only of said light-sensitive units and each being responsive only to changes in the conductivity of the light-sensitive unit connected thereto corresponding to the movement of a hole past such unit.

15. Cloth inspection apparatus for determining the existence of slubs and holes in cloth comprising means for advancing the cloth along a path; a plurality of light-sensitive units arranged across substantially the entire width of the cloth passing along said path and responding to density variations in the cloth by changes in their electrical conductivity, each of said units being operable to sense the condition of a segment only of the width of the cloth and to produce positive and negative pulses in response to slubs and holes; a group of first electrical discriminator means each including a unidirectional current flow device operably connected to one only of said light-sensitive units and being responsive only to pulses from the light-sensitive unit connected thereto, and regulatable means for biasing each said flow device to prevent the passage of signals therethrough except when a positive pulse of at least a predetermined height is delivered by the light-sensitive unit connected thereto; and a group of second electrical discriminator means each including a unidirectional current flow device operably connected to one only of said light-sensitive units and being responsive only to negative pulses from the light-sensitive unit connected thereto, and regulatable means for biasing each of last-mentioned flow devices to prevent the passage of signals therethrough except when a negative pulse of at least a predetermined height is delivered by the light-sensitive unit connected thereto.

16. Apparatus for examining textile fabrics comprising means for advancing a fabric along a path, light-sensitive means on one side of said path, an arc discharge lamp on the other side of said path opposite said light-sensitive means, said lamp extending across the entire width of the advancing fabric, circuit means for supplying energizing current to said lamp at a frequency above 20 kilocycles per second so that the lamp will not flicker at a frequency of an order close to the frequencies of the light variations resulting from the passage of light through spaces between the threads of the advancing fabric, and amplifier means connected to said light-sensitive means and operating to amplify signals from said light-sensitive means having frequencies corresponding to those of the light variations resulting from the passage of light through the spaces between the threads of the advancing fabric.

References Cited in the file of this patent

UNITED STATES PATENTS

| | | |
|---|---|---|
| 2,075,200 | Ibuka | Mar. 30, 1937 |
| 2,101,710 | Huber | Dec. 7, 1937 |
| 2,300,916 | Furedy | Nov. 3, 1942 |
| 2,346,240 | Thomas | Apr. 11, 1944 |
| 2,395,181 | Hags | Feb. 19, 1946 |
| 2,438,365 | Hepp et al. | Mar. 23, 1948 |
| 2,458,926 | Bassett | Jan. 11, 1949 |
| 2,517,330 | Marenholtz | Aug. 1, 1950 |
| 2,622,147 | Condliffe et al. | Dec. 16, 1952 |
| 2,635,215 | Shoemaker | Apr. 14, 1953 |
| 2,641,158 | Sweet | June 9, 1953 |
| 2,667,535 | Slayton | Jan. 26, 1954 |
| 2,749,533 | Daniels | June 5, 1956 |
| 2,758,712 | Linderman | Aug. 14, 1956 |
| 2,878,395 | Mindheim | Mar. 17, 1959 |

FOREIGN PATENTS

| | | |
|---|---|---|
| 719,899 | Great Britain | Dec. 8, 1954 |